United States Patent

Moise et al.

[11] Patent Number: 6,008,917
[45] Date of Patent: Dec. 28, 1999

[54] APPARATUS AND METHOD FOR OPTICAL COMMUNICATION

[75] Inventors: Theodore S. Moise, Dallas; Gary A. Frazier, Garland, both of Tex.

[73] Assignee: Texas Instruments Incorporated, Dallas, Tex.

[21] Appl. No.: 08/960,444

[22] Filed: Oct. 29, 1997

[51] Int. Cl.[6] .......................... H04B 10/24; H04B 10/02
[52] U.S. Cl. ..................... 359/113; 359/152; 359/174
[58] Field of Search ........................... 359/152, 174, 359/113, 173, 179, 163; 257/82–84

[56] References Cited

U.S. PATENT DOCUMENTS

| | | | |
|---|---|---|---|
| 4,985,621 | 1/1991 | Aull et al. | 250/213 A |
| 4,989,935 | 2/1991 | Stein | 350/96.11 |
| 5,223,802 | 6/1993 | Harvey et al. | 331/177 R |

*Primary Examiner*—Kinfe-Michael Negash
*Attorney, Agent, or Firm*—Christopher L. Maginniss; W. James Brady III; Ronald L. Donaldson

[57] ABSTRACT

Apparatus for optical communications (10, 20, 30, 60 90) includes an optically switched resonant tunneling device (12, 22, 42, 62, 92) being exposed to an input light. The optically switched resonant tunneling device (12, 22, 42, 62, 92) generates a first and second voltage levels in response to the intensity level of the input light. A lasing device (16, 28, 46, 68, 74, 100) is coupled to the optically switched resonant tunneling device (12, 22, 42, 62, 92). The lasing device (16, 28, 46, 68, 74, 100) generates and modulates an output light in response to the first and second voltage levels.

22 Claims, 2 Drawing Sheets

APPARATUS AND METHOD FOR OPTICAL COMMUNICATION

TECHNICAL FIELD OF THE INVENTION

This invention is related in general to the field of electronic devices and systems. More particularly, the invention is related to apparatus and method for optical communication.

BACKGROUND OF THE INVENTION

Conventional optical repeater circuits require a complex series of both analog and digital signal processing components. For example, an input optical signal is first converted to a photocurrent signal using either p-i-n diodes, m-s-m diodes or avalanche photodetectors. The photocurrent signal is then converted into a small analog voltage by a high speed transimpedance amplifier. The small analog voltage is then amplified by an amplifier and digitized by an analog-to-digital converter to restore the original electronic digital signal. The digital signal is then used to drive a modulator and laser to generate an output optical signal. Therefore, the conventional repeater circuit requires at least six circuit elements to accomplish the task of detecting the intensity of an input light and retransmitting a light of similar intensity as an output light.

In most high speed optical fiber links, data transmission along the fiber is uni-directional and the optical transmitter and receiver, positioned at opposite ends of the fiber, can be independently optimized for high speed operation. However in duplex communication applications, because both a transmitter and receiver are needed at each end of the fiber, the system is substantially more complex. One conventional optical transceiver that perform both the transmission and reception functions uses a transmitting laser as a receiver. Such transceivers cannot operate bi-directionally simultaneously; in other words, such transceivers cannot transmit and receive simultaneously. Other conventional transceiver systems require the use of waveguide splitters to provide separate paths for the transmitted and received optical signals.

It is recently discovered that certain resonant tunneling diodes exhibit opto-electronic characteristics. For example, as discussed in "Optically Switched Resonant Tunneling Diodes," by Moise et al., Applied Physics Letter, Feb. 27, 1995, resonant tunneling diodes can switch between a high conductance and a low conductance electrical state depending on the level of illumination thereon. The switching characteristics are reversible and, in the absence of light, the detector returns to its original high conductance operating state.

SUMMARY OF THE INVENTION

According to the teachings of the present invention, the optically switched resonant tunneling devices are advantageously applied to the optical repeater and transceiver applications.

In accordance with the present invention, apparatus and method for optical communication are provided which eliminate or substantially reduce the disadvantages associated with prior circuits.

In one aspect of the invention, an optical repeater includes an optically switched resonant tunneling device being exposed to an input light. The optically switched resonant tunneling device generates a first and second voltage levels in response to the intensity level of the input light. A lasing device is coupled to the optically switched resonant tunneling device. The lasing device generates and modulates an output light in response to the first and second voltage levels.

In another aspect of the invention, an integrated optical repeater includes an optically switched resonant tunneling structure being optically coupled to a first optical fiber carrying an input light. The optically switched resonant tunneling structure is adapted to generate a first and second voltage levels in response to the intensity level of the input light. A lasing structure is coupled to the optically switched resonant tunneling structure for generating and modulating an output light in response to the first and second voltage levels. An optically absorbing layer is further disposed between the optically switched resonant tunneling structure and lasing structure for absorbing the input light.

In yet another aspect of the invention, an integrated optical repeater includes an optically switched resonant tunneling structure optically coupled to an optical fiber. The optically switched resonant tunneling structure is adapted to generate a first and second voltage levels in response to the intensity level of the incident light. A lasing structure is coupled to the optically switched resonant tunneling structure for generating and modulating an output light in response to the first and second voltage levels. An optically absorbing layer is further disposed between the optically switched resonant tunneling structure and lasing structure for absorbing the incident light. A switch is further coupled between the optically switched resonant tunneling structure and the lasing structure for turning on and off the lasing structure in response to the first and second voltage levels.

In a further aspect of the invention, an optical duplex communication system is provided. The communications system includes a first and second transceiver, each transceiver includes a lasing device and an optically switched resonant tunneling device. The lasing devices transmit light in two predetermined wavelengths.

A technical advantage of the present invention is the provision of a compact optical repeater that does not require the use of various analog and digital signal processing components as in conventional systems. Furthermore, an integrated repeater may be implemented and constructed using semiconductor technology to achieve even greater cost and space savings.

BRIEF DESCRIPTION OF THE DRAWINGS

For a better understanding of the present invention, reference may be made to the accompanying drawings, in which.

DETAILED DESCRIPTION OF THE INVENTION

Figure 1:
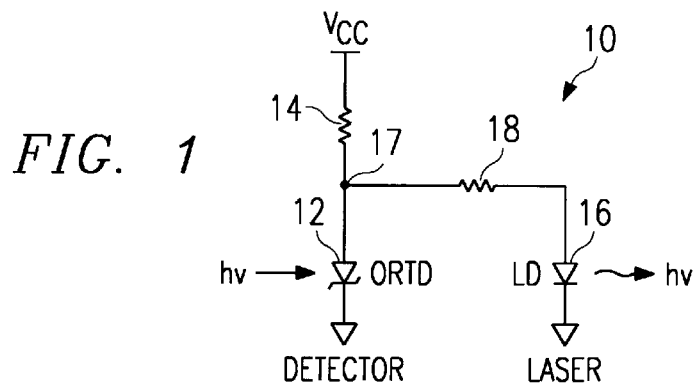
FIG. 1 is a simplified schematic diagram of an exemplary repeater circuit constructed according to the teachings of the present invention.

The preferred embodiment(s) of the present invention is (are) illustrated in FIGS. 1–6, like reference numerals being used to refer to like and corresponding parts of the various drawings.

Referring to FIG. 1, an exemplary optical repeater circuit 10 includes an optically-switched resonant tunneling device (ORTD) or optical detector 12 coupled between a biasing voltage, $V_{CC}$, and ground. A resistor 14 of a predetermined resistance value may further be coupled between $V_{CC}$ and resonant tunneling device 12. A laser diode or optical transmitter 16, is further coupled between a node 17, located between resistor 14 and detector 12, and ground. An optional resistor 18 of a predetermined resistance may be coupled between node 17 and laser diode 16.

In operation, optically-switched resonant tunneling device 12 is exposed to an incident light or irradiance, $E=h\upsilon$, having a wavelength falling within a predetermined range of interest. The intensity of the incident light may be modulated to carry information. If the intensity of the incident light striking resonant tunneling device 12 is greater than a predetermined level associated with the threshold value of resonant tunneling device 12, device 12 is in a low-conductance, high-voltage state. This maintains node 17 at a high voltage corresponding to VCC minus the voltage drop across resistor 14, so that laser diode 16 is forward biased into a lasing mode. Light of a predetermined wavelength is thus emitted and transmitted from laser diode 16.

If, on the other hand, the intensity of the incident light is less than the predetermined level associated with the threshold value of resonant tunneling device 12, then device 12 switches into a high-conductance, low-voltage operating state. The voltage level at node 17 is thus low or close to ground, and laser diode 16 is turned off. Thus, when the incident light is "on," laser diode 16 is biased to transmit light; when the incident light is "off," laser diode 16 is turned off.

Figure 2A:
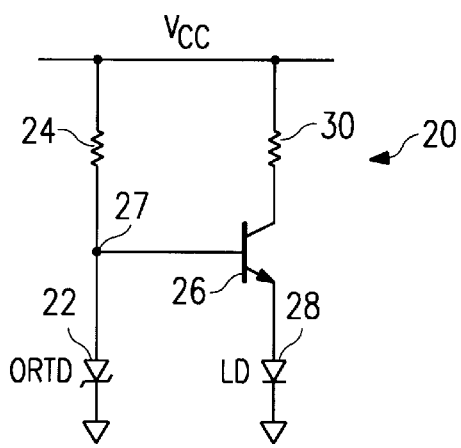
FIGS. 2A and 2B are simplified schematic diagrams of alternative exemplary repeater circuits according to the teachings of the present invention.
Figure 2B:
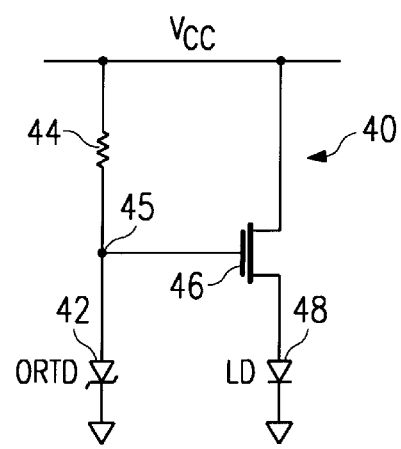

FIGS. 2A and 2B shows alternate embodiments 20 and 40 of repeater circuit 10. Exemplary repeater circuit 20 includes an optically-switched resonant tunneling device 22 coupled to $V_{CC}$, through a resistor 24, and ground. The collector of a transistor 26 is further coupled to $V_{CC}$ through a second resistor 30, with its base being coupled to a node 27 between resistor 24 and resonant tunneling device 22, and its emitter being coupled to a laser diode 28 and ground.

FIG. 2B shows a field effect device embodiment 40 of the repeater circuit. An optically-switched resonant tunneling device 42 is coupled to $V_{CC}$, through a resistor 44, and ground. The gate of a field effect transistor (FET) 44, such as an HFET (high-mobility field effect transistor), is coupled to a node 45 between resistor 44 and resonant tunneling device 42. The drain of transistor 44 is coupled to $V_{CC}$, and its source is coupled to a laser diode 46 and ground.

Repeater circuits 20 and 40 operate in a similar manner. When an input irradiance or light on resonant tunneling device 22 or 42 is higher than its threshold value, device 22 or 42 is in a low-conductance, high-voltage operating state, which turns transistor 26 or 44 on, and thus biasing laser diode 28 or 48 in a lasing mode. When the input irradiance is lower than the threshold level, device 22 or 42 is in a high-conductance, low-voltage operating state, which turns transistor 26 or 44 off, and thus turning off laser diode 28 or 48.

Figure 3:
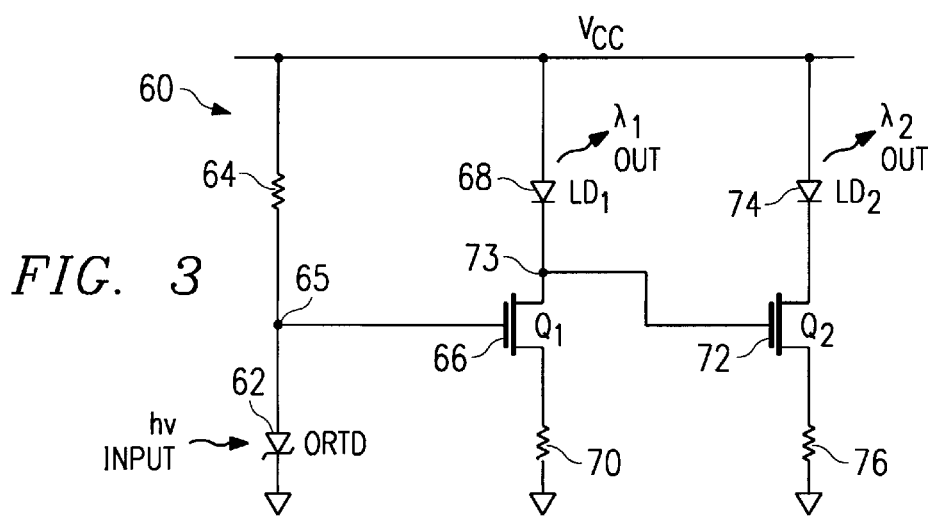
FIG. 3 is a simplified schematic diagram of an exemplary two-laser logical complement repeater circuit according to the teachings of the present invention.

Referring to FIG. 3, an exemplary repeater circuit 60 is provided which both the data signal and its logical complement may be transmitted down the same or separate fibers (not shown). Repeater circuit 60 includes an optically-switched resonant tunneling device 62 which is exposed to an incident irradiance or light. Resonant tunneling device 62 is coupled between $V_{CC}$, through a resistor 64, and to ground. The gate of a first resistor 66, $Q_1$, is coupled to a node 65 between resistor 64 and resonant tunneling device 62; the drain of transistor 66 is coupled to $V_{CC}$ through a first laser diode 68, $LD_1$, and the source of transistor 66 is coupled to ground through a second resistor 70. The gate of a second transistor 72 is coupled to a node 73 between laser diode 68 and transistor 66; the drain of transistor 72 is coupled to a second laser diode 74 which is coupled to $V_{CC}$; and the source of transistor 72 is coupled to ground through a third resistor 76.

In operation, an incident irradiance or light impinges on optically-switched resonant tunneling diode 62. When the intensity level of the incident light is higher than a predetermined value associated with the threshold value of resonant tunneling device 62, device 62 is in a low-conductance, high-voltage state, thus turning transistor 66 on and turning transistor 72 off. Laser diode 68 is therefore in a lasing mode and laser diode 74 is off. On the other hand, when the intensity level of the incident light drops below the predetermined value, resonant tunneling diode 62 is put in a high-conductance, low-voltage operating state. Thus, the low voltage at node 65 turns off transistor 66, and the resulting high voltage at node 73 turns on transistor 72, so that laser diode 68 is off and laser diode 74 is on and transmitting light. It may be seen that laser diodes 68 and 74 may operate to emit light having similar or different wavelengths. Further, the light generated by laser diodes 68 and 74 may be transmitted down the same or different optical fibers. Constructed in this manner, repeater circuit 60 is operable to transmit light of a first wavelength when the input light is high, and to transmit light of a second wavelength when the input light is low, where the first wavelength may be generally equal to the second. Therefore, repeater circuit 60 operates to retransmit the incident light and its logical complement which may be used to fan-out its data signal.

Figure 4:
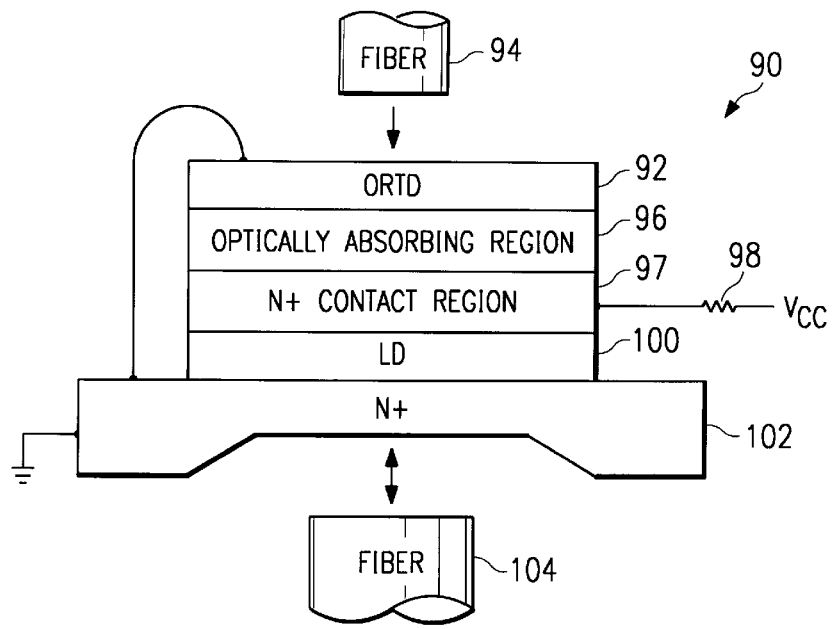
FIG. 4 is a simplified block diagram of an integrated optically-switched resonant tunneling and laser structure applicable to the repeater circuit shown in FIGS. 1–3.

FIG. 4 shows an exemplary semiconductor structure of an integrated repeater circuit 90 according to the teachings of the present invention. An optically-switched resonant tunneling device 92 is positioned proximately to the end of an optical fiber 94 to receive light carried therein. Resonant tunneling device 92 is built on top of an optically absorbing region or layer 96 and an n+ contact region or layer 97, which may be coupled to $V_{CC}$ through a resistor 98. Optically absorbing region 96 may be a layer of undoped semiconductor. Resonant tunneling device 92 and optically absorbing region 96 and n+ contact layer 97 are further built on top of a laser diode 100. Laser diode 100 may be a vertical cavity surface emitting laser (VCSEL) having an n+ upper layer, a dielectric stack, and a gain region (not shown) as known in the art. Other suitable lasing structures may also be incorporated herein. A substrate 102, preferably shaped to accommodate the end of a second optical fiber 104, supports the entire structure. Substrate 102 is coupled to a contact layer (not explicitly shown) of resonant tunneling device 92 and is grounded. Other methods of integrating resonant tunneling device 92 and laser diode 100 may also be used, such as epitaxial transfer.

For a more detailed description of exemplary structures of optically-switched resonant tunneling device 92 which are applicable herein, please refer to patent applications "Transparent Resonant Tunneling Photodetector," U.S. Ser. No.

08/293,766, and "Optical Interconnection System with Resonant Tunneling Photodetector," U.S. Ser. No. 08/293, 767, both filed on Aug. 19, 1994 by Moise et al., incorporated herein by reference (hereinafter "Moise et al."). It may be seen that the semiconductor structure shown in FIG. 4 may be modified to add a transistor, such as shown in FIGS. 2A and 2B, for the alternate embodiments.

In operation, input light relayed by fiber 94 impinges on resonant tunneling device 92 and is stopped from further progress by optically absorbing layer 96. Resonant tunneling device 92 is operable to be in a high-conductance, low-voltage state or a low-conductance, high-voltage state depending on the level of the input light. If the input light is above the threshold value of resonant tunneling device 92, then it is in a low-conductance, high-voltage state, which biases laser diode 100 in a lasing mode. The light generated by laser diode 100 is then received by fiber 104 and transmitted. If the input light carried in fiber 94 is lower than the threshold value, then resonant tunneling device 92 is in a high-conductance, low-voltage state, which turns laser diode 100 off. Thus no light is transmitted down fiber 104.

Figure 5:
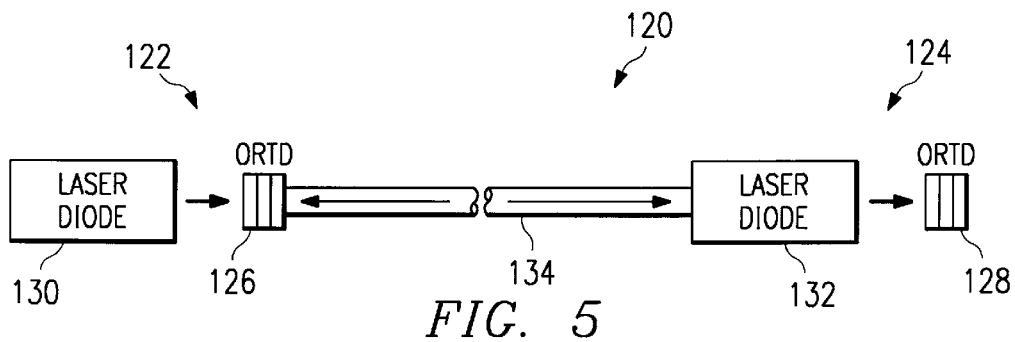
FIG. 5 is a simplified block diagram of a duplex optical communication system constructed according to the teachings of the present invention.

FIG. 5 is a simplified block diagram of a high speed duplex optical communications system 120. Duplex optical communications system 120 uses a first and second transceivers 122 and 124. First and second transceivers 122 and 124 each includes an optically switched resonant tunneling device 126 and 128, respectively, vertically-integrated with a laser structure 130 and 132, respectively. First and second transceivers 122 and 124 are in optical communications with one another, such as through an optical fiber 134.

Figure 6:
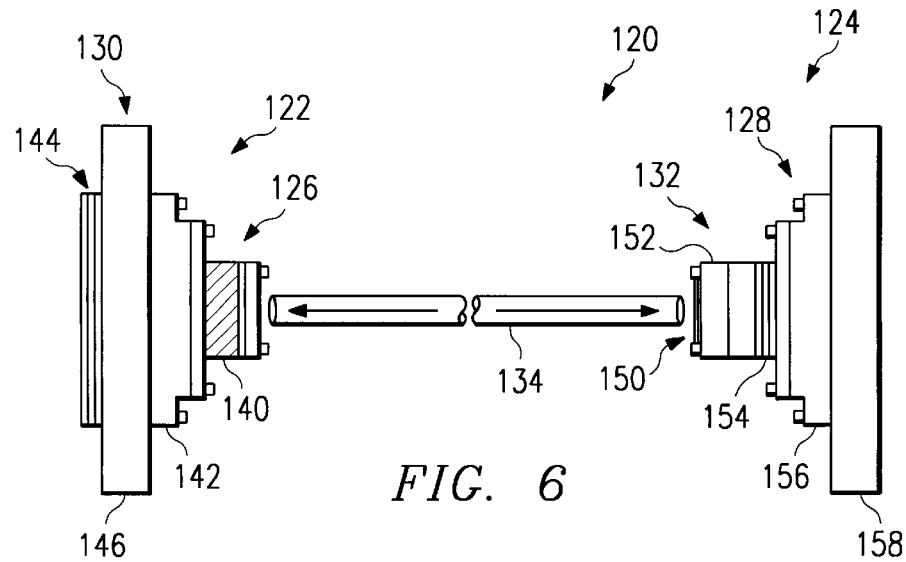
FIG. 6 is a simplified epitaxial layer diagram required to realize the full duplex optical communication system outlined in FIG. 5.

FIG. 6 is a block diagram of exemplary structures of first and second transceivers 122 and 124 in duplex optical communications system 120 shown in FIG. 5. Transceiver 122 includes an optically switched resonant tunneling device 126 operating in a the 1.3 μm range and a laser 130 operating in the 1.5 μm range, for example. Optically switched resonant tunneling device 126 has a structure which includes a number of layers of various semiconductor materials such as described in Moise et al., including an optically absorbing region 140. Optically absorbing region 140 is adapted for absorbing light having a predetermined wavelength, such as 1.3 or 1.4 μm. Laser 130 of transceiver 122 includes a quantum well 142 disposed between optically absorbing region 140 and a substrate 146. Laser 130 further includes a dielectric mirror stack 144.

Transceiver 124 includes a laser 132 operating in the 1.3 μm range and an optically switched resonant tunneling device 128 operating in the 1.5 μm range, for example. Laser 132 has a 1.3 μm dielectric stacks 150 and 154, and a 1.3 μm quantum well 152. Optically switched resonant tunneling device 128 includes an absorbing layer 156 adapted for absorbing light of a predetermined wavelength. A substrate 158 is further provided for the vertically integrated optical transceiver.

In operation, laser diode 130 of transceiver 122 emits a light having a long wavelength, for example 1.5 μm. Optically switched resonant tunneling device 126, having an absorption cutoff of 1.4 μm, for example, allows all or a substantial portion of the longer wavelength light to pass through and be transmitted through fiber 134 to transceiver 124. All or a majority of the longer wavelength light also passes through laser diode 132, which also operates at a shorter wavelength, for example 1.3 μm. The longer wavelength light then reaches optically switched resonant tunneling diode 128 and puts it into a high-conductance, low-voltage state or a low-conductance, high-voltage state, depending on the intensity of the light received, to bias circuitry (not shown) coupled thereto. In the other direction, laser diode 132 emits an optical signal with a shorter wavelength, such as 1.3 μm, which is received and absorbed by optically switched resonant tunneling device 126 without interacting with laser diode 130. Constructed and operating in this manner, high speed duplex optical communication in the gigabyte range is realized.

Although the present invention and its advantages have been described in detail, it should be understood that various changes, substitutions and alterations can be made therein without departing from the spirit and scope of the invention as defined by the appended claims.

What is claimed is:

1. An optical repeater, comprising:
    an optically switched resonant tunneling device being exposed to an input light, said optically switched resonant tunneling device generating a first and second voltage levels in response to an intensity level of said input light; and
    a lasing device coupled to said optically switched resonant tunneling device for generating and modulating an output light in response to said first and second voltage levels.

2. The optical repeater, as set forth in claim 1, further comprising a resistor being coupled between a power supply and said optically switched resonant tunneling device.

3. The optical repeater, as set forth in claim 1, further comprising a switch coupled between said optically switched resonant tunneling device and said lasing device, said switch turning on and off said lasing device in response to said first and second voltage levels.

4. The optical repeater, as set forth in claim 1, further comprising a transistor coupled between said optically switched resonant tunneling device and said lasing device, said transistor turning on and off said lasing device in response to said first and second voltage levels.

5. The optical repeater, as set forth in claim 1, further comprising a second lasing device coupled to said optically switched resonant tunneling device for generating and modulating a second output light in response to said first and second voltage levels.

6. The optical repeater, as set forth in claim 1, further comprising:
    a first switch coupled between said optically switched resonant tunneling device and said lasing device, said switch turning on and off said lasing device in response to said first and second voltage levels;
    a second lasing device coupled to said optically switched resonant tunneling device for generating and modulating a second output light; and
    a second switch coupled between said optically switched resonant tunneling device and said second lasing device, said second switch turning on and off said second lasing device in response to said first and second voltage levels.

7. The optical repeater, as set forth in claim 1, further comprising:
    a first transistor coupled between said optically switched resonant tunneling device and said lasing device, said first transistor turning on and off said lasing device in response to said first and second voltage levels;
    a second lasing device coupled to said optically switched resonant tunneling device for generating and modulating a second output light; and
    a second transistor coupled between said optically switched resonant tunneling device and said second lasing device, said second transistor turning on and off said second lasing device in response to said first and second voltage levels.

8. The optical repeater, as set forth in claim 1, wherein said optically switched resonant tunneling device generates said first and second voltage levels in response to said input light intensity level being greater or less than a predetermined threshold level.

9. An integrated optical repeater, comprising:

an optically switched resonant tunneling structure optically coupled to a first optical fiber carrying an input light, said optically switched resonant tunneling structure generating a first and second voltage levels in response to an intensity level of said input light;

a lasing structure being coupled to said optically switched resonant tunneling structure for generating and modulating an output light in response to said first and second voltage levels; and an optically absorbing layer disposed between said optically switched resonant tunneling structure and lasing structure for absorbing said input light.

10. The integrated optical repeater, as set forth in claim 9, further comprising a resistor coupled between said optically absorbing layer and a power supply.

11. The integrated optical repeater, as set forth in claim 9, further comprising a substrate disposed adjacent to said lasing structure and being coupled to ground.

12. The integrated optical repeater, as set forth in claim 9, further comprising a second fiber being positioned in optical communications with said lasing structure f or transmitting said output light.

13. The integrated optical repeater, as set forth in claim 9, wherein said lasing structure is a vertical cavity surface emitting laser.

14. Apparatus for optical communication, comprising:

an optically switched resonant tunneling structure optically coupled to a first optical fiber carrying an input light, said optically switched resonant tunneling structure generating a first and second voltage levels in response to an intensity level of said input light being greater or less than a predetermined threshold;

a lasing structure being coupled to said optically switched resonant tunneling structure for generating and modulating an output light in response to said first and second voltage levels;

an optically absorbing layer disposed between said optically switched resonant tunneling structure and lasing structure for absorbing said input light; and a switch being coupled between said optically switched resonant tunneling structure and said lasing structure, said switch turning on and off said lasing structure in response to said first and second voltage levels.

15. The integrated optical repeater, as set forth in claim 14, further comprising a resistor coupled between said optically absorbing layer and a power supply.

16. The integrated optical repeater, as set forth in claim 14, further comprising a substrate disposed adjacent to said lasing structure and being coupled to ground.

17. The integrated optical repeater, as set forth in claim 14, further comprising a second fiber being positioned in optical communications with said lasing structure for transmitting said output light.

18. The optical repeater, as set forth in claim 14, wherein said switch is a transistor.

19. The optical repeater, as set forth in claim 14, further comprising a second lasing structure coupled to said optically switched resonant tunneling structure for generating and modulating a second output light in response to said first and second voltage levels.

20. The optical repeater, as set forth in claim 14, further comprising:

a second lasing structure coupled to said optically switched resonant tunneling structure for generating and modulating a second output light; and a second switch coupled between said optically switched resonant tunneling structure and said second lasing structure, said second switch turning on and off said second lasing structure in response to said first and second voltage levels.

21. An optical duplex communications system, comprising:

a first and second transceiver being in optical communication with one another;

said first transceiver including:
a first lasing device for generating and modulating a first light having a first predetermined range of wavelengths and traveling in a first direction toward said second transceiver; and
a first optically switched resonant tunneling device coupled to said lasing device and being substantially optically transparent to said first light;

said second transceiver including:
a second lasing device for generating and modulating a second light having a second predetermined range of wavelengths and traveling in a second direction toward said first transceiver, said second lasing device being substantially optically transparent to said first light; and
a second optically switched resonant tunneling device coupled to said second lasing device;

said second optically switched resonant tunneling device receiving said first light and being optically switched thereby, and said first optically switched resonant tunneling device receiving said second light and being optically switched thereby.

22. The optical duplex communications system, as set forth in claim 21, wherein said first lasing device is vertically integrated with said first optically switched resonant tunneling device, and said second lasing device is vertically integrated with said second optically switched resonant tunneling device.

* * * * *